UNITED STATES PATENT OFFICE.

ARTHUR A. LIBBY, OF CHICAGO, ILLINOIS.

IMPROVEMENT IN PRESERVING MEATS IN THE RAW STATE.

Specification forming part of Letters Patent No. 213,824, dated April 1, 1879; application filed November 14, 1878.

*To all whom it may concern:*

Be it known that I, ARTHUR A. LIBBY, of Chicago, in the State of Illinois, have invented certain new and useful Improvements in the Process of Preserving Raw Meat; and I do hereby declare that the following is a full, clear, and exact description of the invention, which will enable others skilled in the art to which it appertains to make and use the same.

My invention relates to the preservation of meats in the raw state.

As a preliminary measure the meat should be slaughtered under conditions favorable to its preservation, and to the exclusion of the germs of fermentation, such as are well known in this art. These I do not claim.

During the slaughtering of the cattle and the preparation of the meat for packing, I employ a low temperature and dryness, either natural or produced by artificial means, because cold and dryness prevent the development of the ferment of the air, while moisture accelerates the same.

The process which I desire to describe in this application is as follows: The meat, having first been properly dressed, is allowed to remain a sufficient length of time, previous to packing for final preservation, for the animal heat to be thoroughly and slowly eliminated, and the flesh thereby to become firm in texture. The raw meat is then cut into pieces of the requisite size for preservation, which pieces are then immersed in, or brushed over with, a solution of bisulphite of lime or salicylic acid. The meat is then permitted to remain a short time, in order that the solution or coating may become dry. It is then, either with or without bone, put into a tin or tinned can, case, or vessel, the cover of which is preferably conical or pyramidal, or rising to a point at the center thereof. The vessel may, however, be made of any suitable material. The interior of the can or vessel and the inside of the cover intended for the same are then lined or coated with glycerine, glue, or any other sticky substance not liable injuriously to affect the taste or flavor of the meat. The cover is then soldered or otherwise fastened on.

The cover has a small hole preferably near the center of the same, and is provided with a small injecting-tube, which enters the can through the cover near the edge or periphery thereof, where it is made air-tight in said cover. The tube is made of sufficient length to nearly reach the bottom of the vessel. It also extends a sufficient distance outside the cover to allow another pipe to enter into it. The tube which enters the cover is made on the outside of soft flexible iron tinned, so that it can be easily squeezed or compressed tightly together for the purpose of closing the can air-tight, or a tap may be used to close the tube.

The meat, after being prepared as above described, is first placed in the can and the cover thereof is hermetically sealed to the can. I then attach to or introduce into the injecting-tube herein described a pipe, through which I force cool air into and through the can and the contents, and out through the small hole in the center of the cover of the can. This air has been previously calcined and deprived of all its fermentative germs by being passed through heated sinuous or bent platinum tubes containing bundles of platinum wire. The pure calcined air is then cooled and forced into the can through the injecting-tube, and escapes through a hole in the cover of the can. This creates a current in the can, which is continued until the causes of fermentation in the can are either forced out through the center of the cover or lodged in the glycerine or sticky substance with which the interior of the can is coated.

In the sticky or adhesive lining a proportion of the germs of the fermentative process become fastened and imprisoned. I then, while the current of cool calcined air is passing through the can and its contents, first close the small hole in the cover, and then instantly, and while the current of calcined air is being forced into the can, close the mouth of the injecting-tube, hermetically sealing the same, thus completing the process.

I do not claim in this application the can herein described, the structure of the same being only alluded to as necessary to a clear exposition of the process which is the subject of this application.

What I claim as my invention, and desire to secure by Letters Patent, is—

The process of preserving raw meat from decomposition or putrefaction, which consists in the following five steps in successive order—viz., cooling the meat in order to slowly eliminate the animal heat, cutting it into pieces of the proper size, brushing it or bathing it in a preservative solution, such as a solution of bisulphite of lime or salicylic acid, drying the solution upon the meat, placing the meat in a vessel coated on the interior, and being hermetically sealed, and then submitting the article to be preserved to a current of cool and previously-calcined air, and then closing the can or vessel, the whole substantially as herein described.

In testimony that I claim the foregoing I hereto set my hand this 12th day of November, A. D. 1878.

ARTHUR A. LIBBY.

Witnesses:
WILLIAM HENRY CLIFFORD,
CHARLES E. CLIFFORD.